May 22, 1928.

G. ANDERSON

SAW SET

Filed March 26, 1927

WITNESS

INVENTOR
Gustaf Anderson
BY
ATTORNEY

Patented May 22, 1928.

1,670,705

UNITED STATES PATENT OFFICE.

GUSTAF ANDERSON, OF SEATTLE, WASHINGTON.

SAW SET.

Application filed March 26, 1927. Serial No. 178,670.

My present invention relates to improvements in saw sets of that class, wherein the device itself is being held in one hand by the operator in operative relation to the saw teeth, while a blow is being struck on a setting plunger by the operator with a hammer held in the other hand, for setting the teeth of the heavier type of saws, such as cross-cut saws, drag saws and circular saws, and more particularly to improvements in connection with saw sets of the nature described and claimed in my copending application, Serial No. 104,998, filed April 27, 1926.

The primary object of my present invention is to provide a device of this character with a vertically adjustable and manually controlled gage member, to govern the vertical position of the device in respect to its contact with the sides of the saw teeth, so that a uniform depth of set will result, and to provide means for manipulating the gage so as to positively prevent dulling the points of the teeth through shock and vibration of the saw, caused by blows being struck on a setting plunger.

The other objects are:

To provide convenient means for adjusting the device to vary the angle of set in the saw teeth, to obviate the necessity of having to loosen the bracket on the stock when changing the adjustment, which would require a wrench that might be mislaid or lost, to facilitate a closer co-operative relationship between the means that govern the angle of set in the saw teeth and the gage that governs the depth of the set, so that the device may be quickly adjusted for providing a pre-determined width of set in the saw teeth at a pre-determined angle and thereby avoid breaking the teeth of highly tempered saws, and to produce an all around better and cheaper tool of this character than those that have preceded it.

I accomplish these and other objects by the peculiar arrangement and combination of the parts as will be more fully hereinafter described and explained in the following specification, pointed out in the appended claims and illustrated in the accompanying drawings, wherein:

Figure 1:
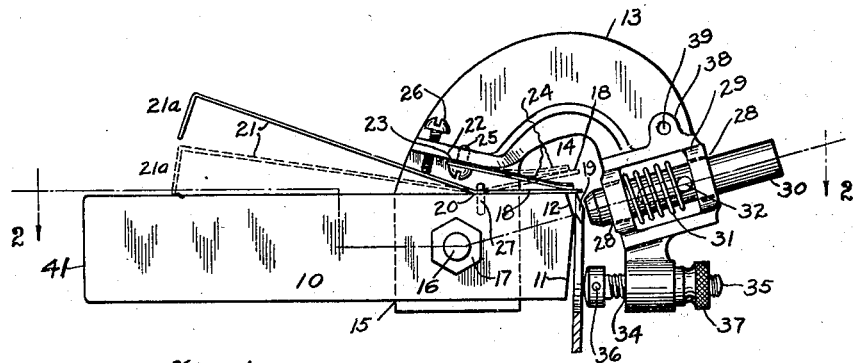
Figure 1 is a side elevation of the saw set showing it in position against a saw tooth to be operated upon; the depth gage is shown in full lines and in dotted lines.
Figure 2:
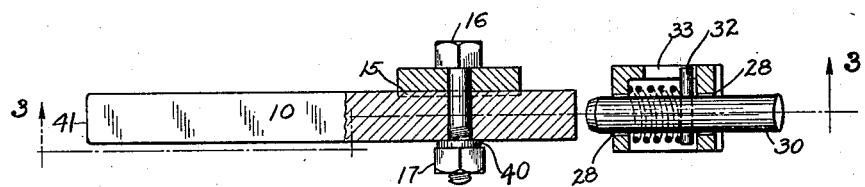
Fig. 2 is a fragmentary sectional view on the line 2—2 of Fig. 1.
Figure 3:
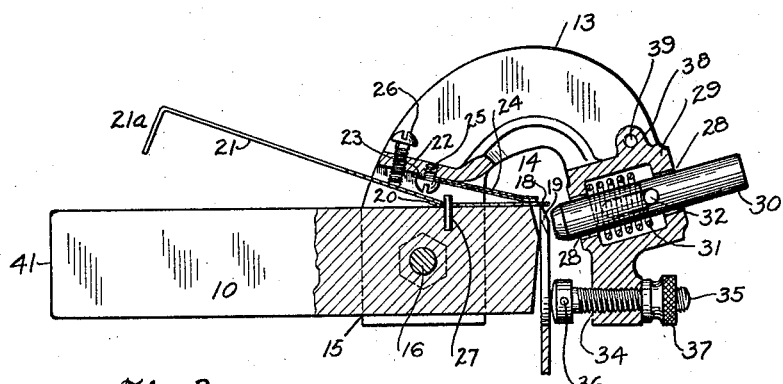
Fig. 3 is a partly sectional view on the line 3—3 of Fig. 2, showing details.

Referring now to these figures, and more particularly to Figures 1 and 2. Reference numeral 10 designates the stock or handle having at one end a slightly inclined face 11 and a bevel constituting an inclined anvil face 12. A bracket 13 of which upper portion I prefer to have in the form of an arch, and the sides to extend downwardly from the arch in vertically spaced relation to form a large view space 14 so as not to obstruct the vision from an operative view point as seen in Figs. 1 and 3. In the rear portion of the bracket 13 is a shallow channel 15 (shown in Fig. 2) that is machined to closely fit the stock 10 and a bolt 16 extends through close fitting apertures in the bracket and in the stock and is engaged by a nut 17 for immovably clamping the bracket to the stock, as shown in Fig. 2. This arrangement obviates the necessity of additional means for preventing the bracket from shifting on the stock when blows are being struck on the setting plunger, presently to be described.

On the top surface of the stock 10 is located a depth gage member 18, of which one end portion lies in contact with the adjacent edge of the inclined anvil face 12 of the stock and extends into the space 14, and contacts with the point of a saw tooth 19 in position to be operated upon, as shown in Figures 1 and 3. The other end portion of the depth gage member 18 is bent upward to form a fulcrum 20 and extends upwardly and rearwardly from the fulcrum 20 to form an actuating lever 21 of which outer end has a downward turn to form a limit stop 21ª. A rib 22 extends laterally from the bracket 13, and on the under side of the rib is a seat 23 to which is secured one end of a spring 24 by means of a screw 25 passing through a perforation in the spring into threaded engagement with the rib 22, and the free end of the spring 24 pressing hard against the front end portion of the depth gage 18, for normally holding the depth gage in contact with the adjacent edge of the anvil face 12 of the stock as shown in Figs. 1 and 3. An adjusting screw 26 passes through a threaded opening in the rib 22 and contacts with the lever portion 21 of the depth gage, that may be advanced or withdrawn to cause the opposite end of the gage member 18 either to rise or descend against the tension of the spring 24 as will readily be understood upon inspection of Fig. 1. A pin 27 is driven into an aperture in the stock 10 and extends upward through a perforation in the fulcrum 20 of the depth gage 18 for holding said depth gage near the adjacent bracket portion, to prevent horizontal swinging and sliding movement of the gage member 18 upon the stock 10, as best seen in Fig. 3.

Extending through apertures 28 in a lateral extension 29 of the front portion of the bracket 13 and freely slidable there-through, is a setting plunger 30, the plunger being urged away from the anvil face 12 of the stock by a coil spring 31 acting against a stop-pin 32 in the plunger, as seen in Figs. 1 and 3; the stop-pin 32 extends through the plunger into a slot 33 in the bracket (seen in Fig. 2) and acts as a limit stop for the outward movement of the plunger 30 and also prevents rotation of the plunger. The extension 29 of the bracket and the setting plunger 30 closely resemble those described and claimed in my copending application Serial No. 104,998, filed April 27, 1926, above referred to.

In the lower front portion of the bracket 13 is a threaded aperture 34 and a gage screw 35 extending there-through as shown in Figures 1 and 3, the head of which I prefer to have on the side toward the face 11 of the stock and may be of any suitable shape for contact with the root portion of the saw teeth; an aperture 36 extends through the head of the gage screw 35, to facilitate easy adjustment of the screw at a pre-determined distance from the face 11 of the stock, and a thumb nut 37 for locking the adjustment as shown in Figures 1 and 3.

In connection with the extension 29 on the bracket is a boss 38 provided with a drilled hole 39 for the reception of a rivet or the like, as seen in Figures 1 and 3, and the nut 17 on the clamping bolt 16 may be provided with a circularized portion 40 as shown in Fig. 2, so that the tool can be furnished with the trigger attachment shown, described and claimed in my co-pending application Serial No. 104,998, filed April 27, 1926, hereinbefore referred to, when commercially required for bringing the setting plunger in contact with the saw tooth prior to a blow being struck on the plunger.

The free end of the stock 10 is provided with a flat anvil face 41 for straightening the body of such saw teeth as may have been sprung out of alignment with the other teeth by twigs or chips brought into the cut during the use of the saw. It is understood that both ends of the stock 10 is hardened, as is also the setting plunger 30. The setting face of the plunger is at right angles with the longitudinal axis of the plunger, and the anvil face 12 of the stock 10 is parallel with the setting face of the plunger.

In operation the device should first be adjusted to give the required width of set in the saw teeth; normally this may be accomplished either by varying the angle of the inclined anvil face 12 of the stock with respect to its contact with the side of the saw tooth, by means of the gage screw 35, or by varying the elevation of the depth gage 18 with respect to the anvil face 12, by means of advancing the adjusting screw 26 against the lever portion 21 of the depth gage; the different forms of adjustment are equally convenient and the operator may select that form of adjustment which best suits his idea, but, when highly tempered saws are being dealt with, and there is danger of breaking the teeth when setting them at a normal angle, then it becomes important to reduce the angle of the set in the teeth by increasing the space between the gage screw 35 and the face 11 of the stock, and regulating the width of the set by adjusting the depth gage 18, which normal position is shown in full lines, and the limit of its vertical movement in dotted lines in Fig. 1. Having adjusted the tool as desired, the operator now grasps the tool with one hand, in such manner as not to press on the lever 21 until after the tool has been canted against the side of the saw tooth with the depth gage 18 resting upon the tooth point 19 as shown in Fig. 1, then the lever 21 is being pressed down the full limit, with the limit stop 21ª in contact with the stock 10 as shown in dotted lines in Fig. 1, and is held in that position until a blow on the outer end of the setting plunger 30 has been struck by the operator with a hammer held in the other hand and the tool removed from the saw tooth. The operation is then repeated on every alternate tooth, first on one side of the saw, then on the other alternate teeth on the other side of the saw. The operation of the depth gage 18 is very easy and the saw teeth are not, as heretofore, being dulled through shock and vibration of the saw when the setting plunger is being struck with a hammer.

To dismember the depth gage 18 and the spring 24 in case of accidental fracture or breakage of either of these members, the bracket 13 is first detached from the the stock 10 by removing the nut 17 from the bolt 16, the depth gage 18 falls away from the stock after the bracket has been detached, and the screw 25 becomes accessible for removing the spring 24 from the rib 22 of the bracket. To re-assemble the parts, the spring 24 is first secured to the rib 22 of the bracket 13 as seen in Figs. 1 and 3, the depth gage 18 is then laid loosely on the stock 10, with the pin 27 extending from the stock through the perforation in the fulcrum 20 of the depth gage, as best seen in Fig. 3, the stock and depth gage is then shoved against the tension of the spring 24 until the side of the stock enters the close fitting channel in the bracket indicated at 15 in Fig. 2, and the bolt 16 inserted through the close fitting apertures in the bracket and in the stock and engaged by the nut 17, as shown in Fig. 2. This arrangement of the parts forms a rigid union of the stock and the bracket after the nut has been tightened, and simplifies the structural co-operating features of the several parts, whereby a highly efficient tool of this nature can be manufactured at low cost.

The foregoing description when taken in connection with the drawings, fully illustrates the simple and inexpensive construction of the device, the advantages and adaptability of the convenient and closely related co-operative means for adjusting the device, so as to conform to the various ideas and practice of saw filers, whereby blows struck on the setting plunger 30 set the teeth evenly at any desired angle and depth, without injuring the points of the saw teeth.

While I have shown and described the preferred embodiment of my invention, various minor changes may be made in the form, construction and arrangement of the parts, therefore, the invention is to be considered comprehensive of all such forms of structure and arrangement of parts, as will fairly fall within the spirit of the invention and scope of the appended claims.

I claim:

1. A saw set of the class described, the combination of a stock having at one end a bevel constituting an inclined anvil face, a detachable and non-slidable bracket having downwardly extending front and rear portions and a space there-between into which said one end of the stock extends, a spring-retracted setting plunger adapted to co-act with said inclined anvil face of the stock, a gage screw carried by said front portion of the bracket beneath said setting plunger, and means associated with said rear portion of the bracket for holding an elongated angular depth gage member in contact with said stock.

2. A saw set of the class described, the combination of a stock having at one end a bevel constituting an inclined anvil face, a bracket having downwardly extending front and rear portions and a space there-between into which said one end of the stock extends, a spring-encircled setting plunger adapted to co-act with said inclined anvil face of the stock, a gage screw carried by said front portion of the bracket beneath said setting plunger, means associated with said rear portion of the bracket for holding an elongated angular depth gage member in contact with said stock, and means for immovably securing the bracket to the stock.

3. A saw set of the class described, the combination of a stock having at one end an inclined anvil face, a bracket secured to the stock and having a front portion extending in front of said one end of the stock and spaced therefrom, a setting plunger and a gage screw carried by said front portion of the bracket, an elongated angular gage member fulcrumed on the stock, whereby to limit the vertical movement of the device with respect to the saw teeth, and means for removing said gage member from the points of the saw teeth prior to a blow being struck on said setting plunger, for the purpose specified.

4. A saw set of the class described, comprising a stock having at one end an inclined anvil face, a bracket secured to the stock and having a front portion extending in front of said one end of the stock and spaced therefrom, a setting plunger and a gage screw carried by said front portion of the bracket, a vertically adjustable elongated angular gage member fulcrumed on the stock, whereby to govern the vertical movement of the device with respect to the saw teeth, and means for removing said gage member from the points of the saw teeth prior to a blow being struck on said setting plunger, for the purpose specified.

5. A saw set of the class described, comprising a stock having at one end an inclined anvil face, a bracket secured to the stock and having a front portion extending in front of said one end of the stock and spaced therefrom, a setting plunger and a gage screw carried by said front portion of the bracket, a vertically adjustable elongated angular gage member fulcrumed on the stock, whereby to govern the vertical movement of the device with respect to the saw teeth, and means under control of the operator, whereby to lift said gage member away from the points of the saw teeth prior to a blow being struck on said setting plunger, for the purpose specified.

6. A saw set of the class described, comprising a stock having at one end an inclined anvil face, a bracket secured to the stock and having a front portion extending in front of said one end of the stock and spaced therefrom, a setting plunger and a gage screw carried by said front portion of the bracket, a vertically adjustable elongated angular depth gage member fulcrumed on the stock, to govern the depth of set in the saw teeth in cooperative relation with said gage screw, whereby to provide a pre-determined width of set in the saw teeth at a pre-determined angle, and means under control of the operator, whereby to hold said depth gage remote from the points of the saw teeth while a blow is being struck on said setting plunger, as and for the purpose described.

7. A saw set of the class described, comprising a stock having at one end an inclined anvil face, a bracket secured to the stock and having a front portion extending in front of said one end of the stock and spaced therefrom, a setting plunger and a gage screw carried by said front portion of the bracket, and an elongated angular depth gage member fulcrumed on the stock and extending partly over the space between said one end of the stock and said front portion of the bracket, resilient means for normally holding said depth gage in contact with the adjacent edge of said anvil face, and means under the control of the operator, whereby to intermittently force said depth gage away from said adjacent edge of the anvil face against the tension of said resilient means, as and for the purpose described.

8. A saw set of the class described, comprising a stock having at one end an inclined anvil face, a bracket secured to the stock and having a front portion extending in front of said one end of the stock and spaced therefrom, a setting plunger and a gage screw carried by said front portion of the bracket, an elongated angular depth gage member fulcrumed on the stock and extending partly over the space between said one end of the stock and said front portion of the bracket, a spring for normally holding said depth gage in contact with the adjacent edge of said anvil face, said depth gage member having a bend to form a fulcrum from which said member extends in an upward and rearward direction to constitute an actuating lever, whereby to control the vertical movement of said depth gage against the tension of said spring, and adjustable means in contact with said lever, whereby to limit the vertical movement of said depth gage at pre-determined elevations from the adjacent edge of said anvil face of the stock.

9. A saw set of the class described, comprising a stock having at one end an inclined anvil face, a bracket secured to the stock and having a front portion extending in front of said one end of the stock and spaced therefrom, a setting plunger and a gage screw carried by the front portion of said bracket, an elongated angular depth gage member having a gage portion and an actuating lever portion fulcrumed on the stock, resilient means in contact with said gage member for normally holding said depth gage in contact with the adjacent edge of said anvil face, adjustable means in contact with said lever portion, for limiting the downward movement of said depth gage against the tension of said resilient means at pre-determined elevations from the adjacent edge of said anvil face, and means extending through a perforation in the fulcrum of the depth gage member into the stock for holding said gage member in place upon the stock.

10. A saw set of the class described, the combination of a stock having at one end an inclined anvil face, a detachable and nonslidable bracket having front and rear portions and a space there-between into which said one end of the stock extends, means for immovably securing the bracket to the stock, a spring-retracted setting plunger and a gage screw carried by said front portion of the bracket, an adjustable elongated angular depth gage member fulcrumed on the stock to govern the depth of set in the saw teeth, means for holding said gage member remote from the points of the saw teeth while a blow is being struck on said setting plunger, resilient means secured to the rear portion of the bracket for holding said depth gage member in contact with the stock, and other means extending from the stock through a perforation in the fulcrum of the gage member and co-operates with the last mentioned means for holding said gage member in place upon the stock.

GUSTAF ANDERSON.